No. 651,646. Patented June 12, 1900.
F. BARR, J. T. CHAMBERLAIN, L. CURTIS, G. L. R. FRENCH,
A. C. STICKNEY & E. T. MILLAR.
SHOULDERING MACHINE FOR RAILROADS.
(Application filed Mar. 7, 1900.)
(No Model.) 6 Sheets—Sheet 2.
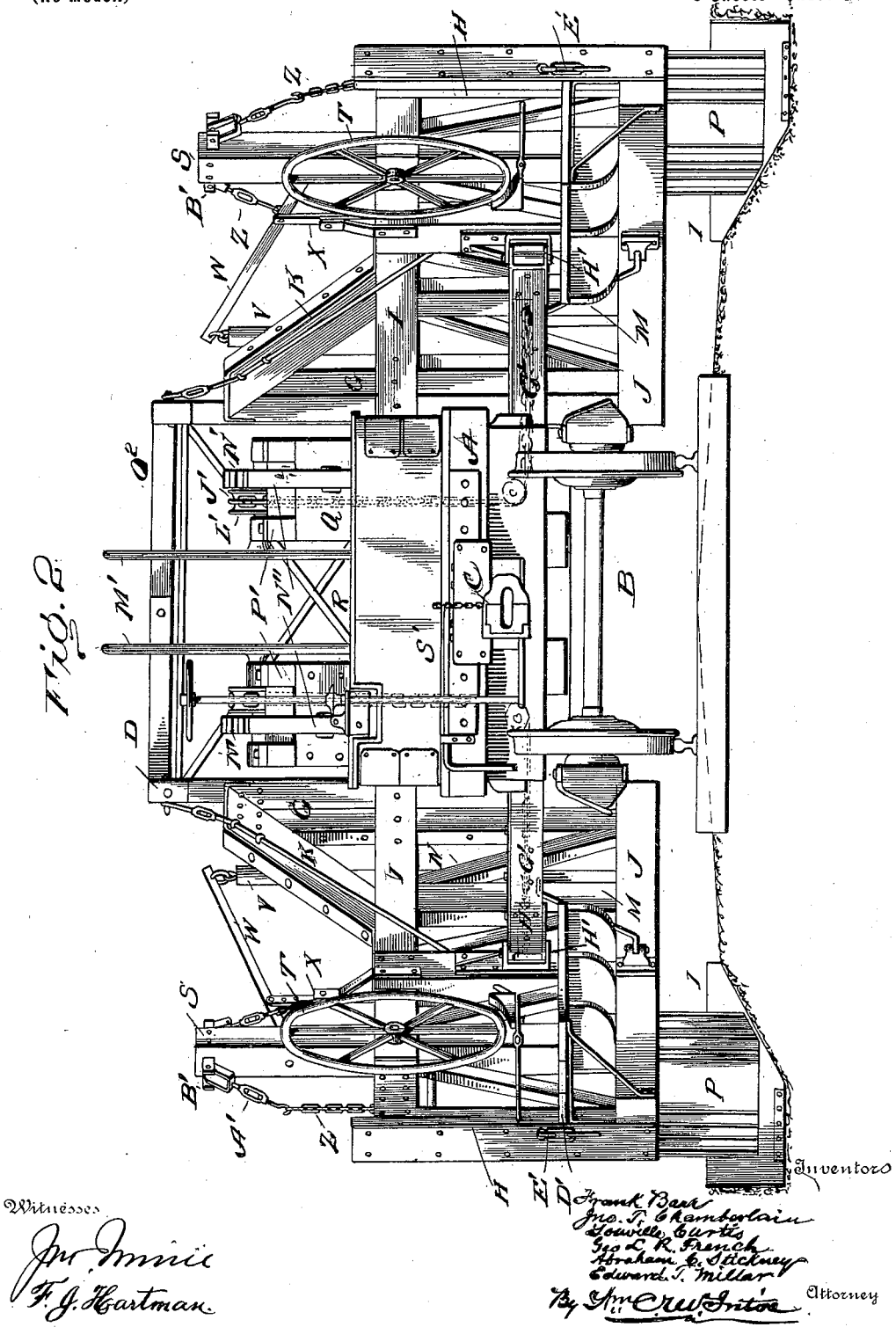

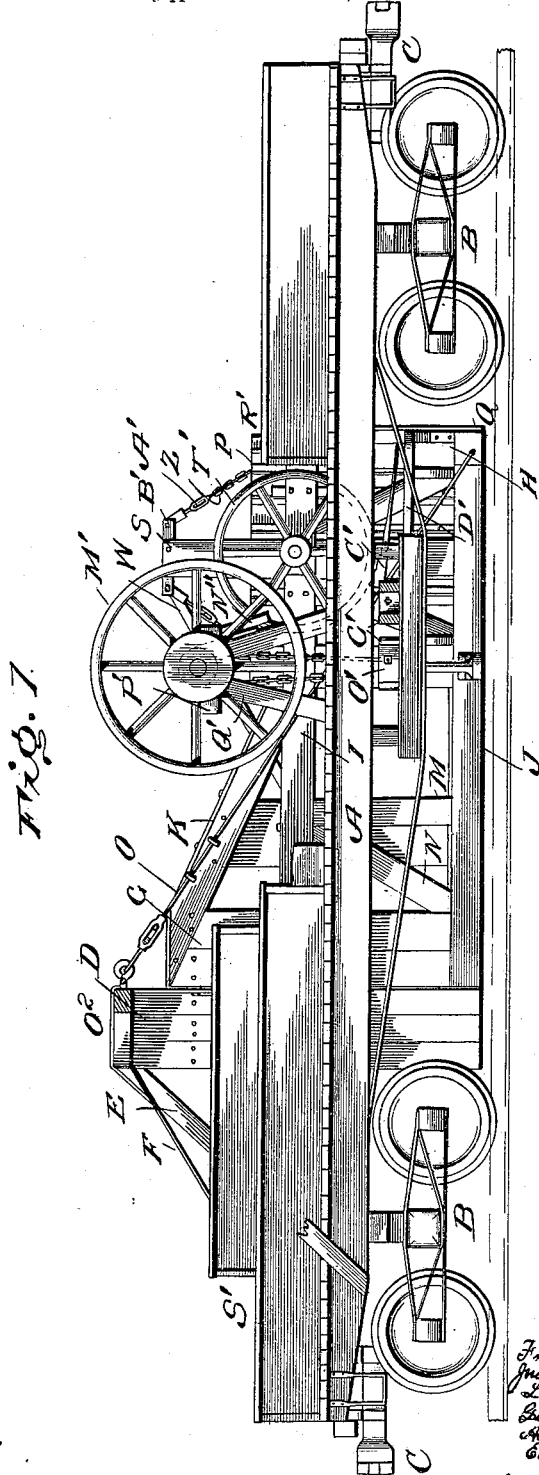

No. 651,646. Patented June 12, 1900.
F. BARR, J. T. CHAMBERLAIN, L. CURTIS, G. L. R. FRENCH,
A. C. STICKNEY & E. T. MILLAR.
SHOULDERING MACHINE FOR RAILROADS.
(Application filed Mar. 7, 1900.)
(No Model.) 6 Sheets—Sheet 3.
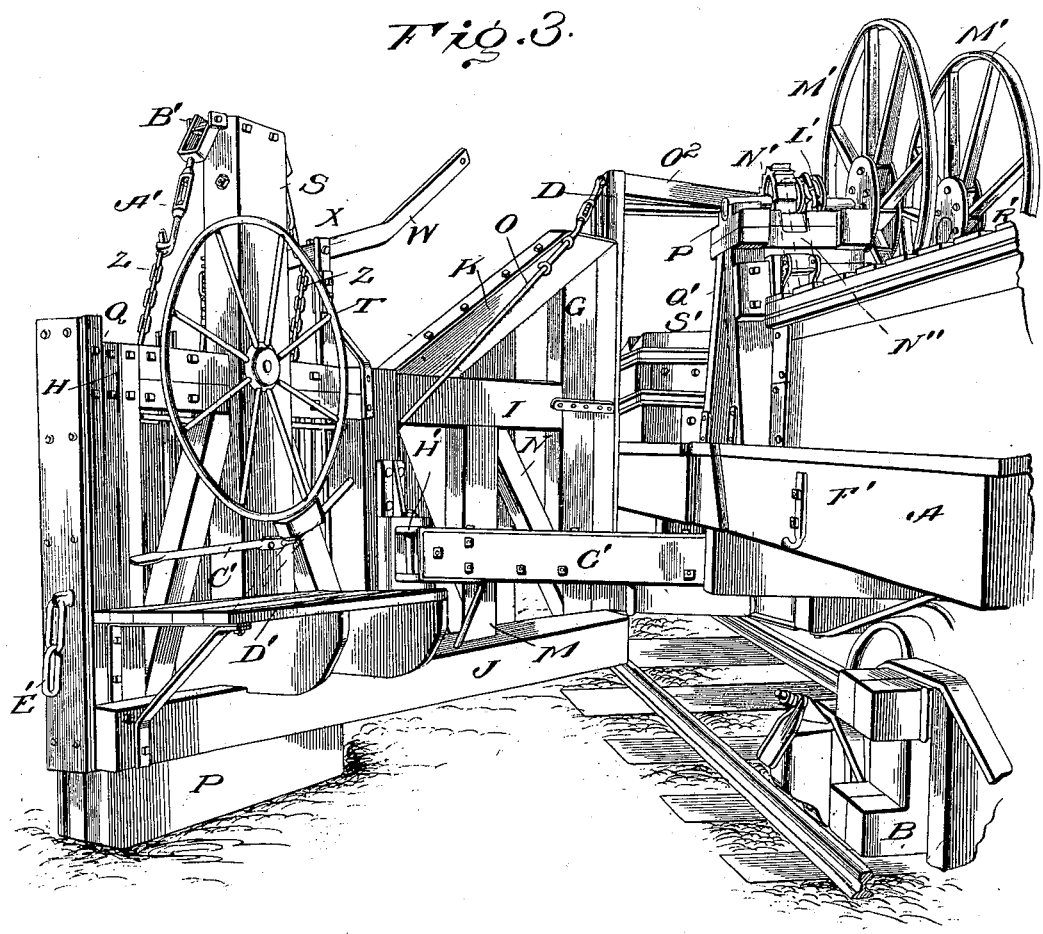
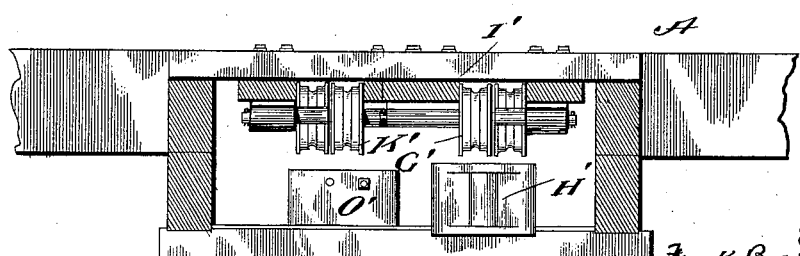

No. 651,646. Patented June 12, 1900.
F. BARR, J. T. CHAMBERLAIN, L. CURTIS, G. L. R. FRENCH,
A. C. STICKNEY & E. T. MILLAR.
SHOULDERING MACHINE FOR RAILROADS.
(Application filed Mar. 7, 1900.)

(No Model.) 6 Sheets—Sheet 4.

Fig. 5.

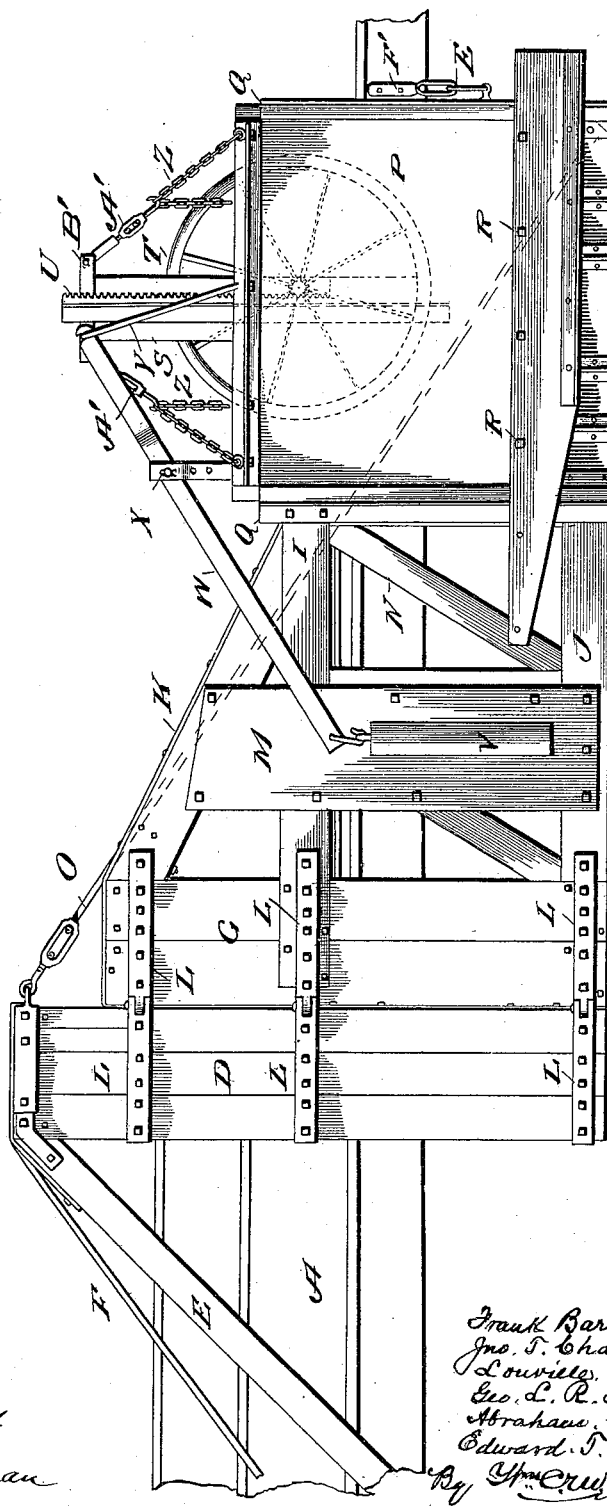

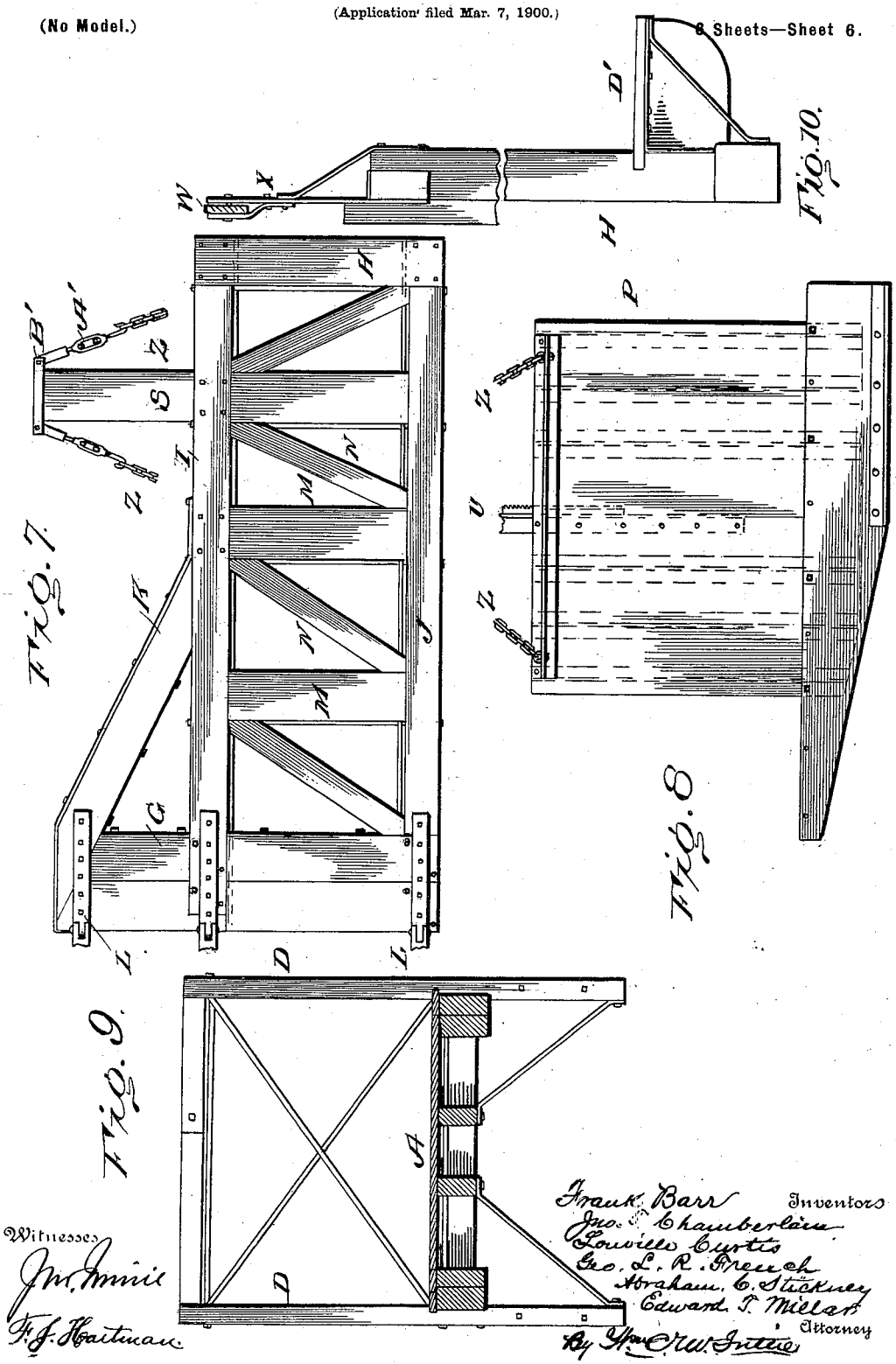

United States Patent Office.

FRANK BARR, OF WINCHESTER, JOHN T. CHAMBERLAIN, OF MEDFORD, LOUVILLE CURTIS, OF LAWRENCE, GEORGE L. R. FRENCH, OF BEVERLY, ABRAHAM C. STICKNEY, OF NORTH READING, AND EDWARD T. MILLAR, OF LAWRENCE, MASSACHUSETTS.

SHOULDERING-MACHINE FOR RAILROADS.

SPECIFICATION forming part of Letters Patent No. 651,646, dated June 12, 1900.

Application filed March 7, 1900. Serial No. 7,720. (No model.)

*To all whom it may concern:*

Be it known that we, FRANK BARR, residing at Winchester, in the county of Middlesex, JOHN T. CHAMBERLAIN, residing at Medford, in the county of Middlesex, LOUVILLE CURTIS, residing at Lawrence, in the county of Essex, GEORGE L. R. FRENCH, residing at Beverly, in the county of Essex, ABRAHAM C. STICKNEY, residing at North Reading, in the county of Middlesex, and EDWARD T. MILLAR, residing at Lawrence, in the county of Essex, State of Massachusetts, citizens of the United States, have invented certain new and useful Improvements in Shouldering-Machines for Railroads; and we do hereby declare the following to be a full, clear, and exact description of the invention, such as will enable others skilled in the art to which it appertains to make and use the same.

Our invention relates to certain new and useful improvements in railroad shouldering-machines.

It has for its objects to provide a machine which shall be adapted to forming a uniform surface of any desired shape in cross-section, to leveling the dirt or ballast and removing surplus material preparatory to laying the ties and rails, to preparing the road-bed for double tracking or for sidings parallel with the main track, to destroying and removing grass, weeds, and other vegetation, and the removal of ice and snow from the immediate vicinity of the track and from the ditches.

It is well known to those familiar with the construction and operation of railroads that the item of grading and preparing the road-bed for the reception of the ties and rails is one of great expense and requires an extended period of time to accomplish when manual labor alone is employed and that by the use of such labor alone it is exceedingly difficult to place the tracks high and dry above the subgrade and to give satisfactory drainage to avoid "shimming" during the winter months.

Our invention consists of a machine adapted to overcome all the disadvantages recited in the use of manual labor and to expeditiously perform the varied kinds of work incident to the preparation and maintenance of road-beds, as will be hereinafter more fully and in detail set forth.

In order that those skilled in the art to which our invention pertains may know how to make and use our improved machine, we will proceed to describe its construction and operation, referring by letters to the accompanying drawings, in which—

Figure 1 is a side elevation with the shouldering mechanism on one side removed to more clearly show the means for operating the gates and the cutter. Fig. 2 is a front elevation with the shouldering mechanism on both sides in operative position. Fig. 3 is a perspective view of a portion of a car and the shouldering mechanism on one side. Fig. 4 is a detail sectional view showing the bars which are attached to the ends of the gates and the guide-rollers which direct the chains to the gates. Fig. 5 is a plan view of the shouldering mechanism and the bars attached to each side, together with the guide-rollers and chain for adjusting the respective shouldering devices. Fig. 6 is an enlarged side elevation of the shouldering device on one side of the car. Fig. 7 is an enlarged view of the framework of the shouldering devices. Fig. 8 is an enlarged view of the sliding adjustable cutter. Fig. 9 is a detail cross-section showing the braces for supporting the standards to which the swinging shouldering devices are attached, and Fig. 10 is a detail cross-section showing one of the shouldering devices and the operating-platform, together with the means for pivoting the counterbalancing-weight lever.

Similar letters of reference indicate like parts in the several figures of the drawings.

A represents a car or platform mounted upon suitable car-trucks B and provided at each end with couplers C. The car and trucks are adapted to the usual-gage railroad and when coupled with an ordinary engine may be readily propelled to perform the work required or transported from one place to another. On each side of the car is securely bolted a vertical frame or post, which is strengthened and rendered rigid by an oblique brace E and suitable brace or tie rods F. A frame or wing adapted to carry a cutter or plow and consisting of front and rear vertical beams G H and horizontal upper and lower beams I J, with an oblique brace K, is hinged to the vertical frame D on each side of the car by strong hinges L, and any desired number of intermediate vertical and oblique braces M N may be employed to add strength and rigidity to the said frame. An adjustable tie-rod O extends from the upper end of the post D to the lower portion of the free end of the plow-frame to prevent the latter from sagging.

P is the cutter-blade or plow carrier, which is adapted to reciprocate vertically within or between vertical guides Q on the wing or frame. To the lower portion of the carrier P a blade, shoulder-cutter, or plow of any desired form is removably and adjustably secured by bolts R, and to a centrally-arranged beam S of the hinged or swinging frame or wing is journaled a hand-wheel T, the shaft of which is provided with a pinion (shown in dotted lines at Fig. 6) meshing with a vertical rack U, secured to the cutter-frame, so that the rotation of the hand-wheel T will cause the carrier P and its cutting device to rise, the upward movement of which is assisted by a counterbalance-weight V at the lower end of a lever-bar W, pivoted to an upright X, secured to the hinged or swinging frame, the upper end of this lever-bar W being connected by a link or rod Y with the upper edge of the cutter-carrier P, all as clearly shown at Fig. 6. The carrier P is held in parallelism and proper relation to its guides Q by chains Z, connected to the carrier, and adjustable swivel-hooks A', secured to a cross-bar B', attached to the upper end of the vertical beam S. A foot-brake C', (see Fig. 3,) with its brake block or shoe adapted to contact with the periphery of the hand-wheel T, holds the carrier-frame in its elevated position, and when the brake is released the carrier and its cutting devices descend by gravity to any desired plane.

D' is a foot board or platform secured on the inside of the hinged or swinging frame or wing and is adapted to carry a man to operate the wheel T and brake C'. This platform is secured in such a plane that when the swinging frames or wings are folded inwardly, as shown at Fig. 5, the platforms will travel under the side sills of the car-frame, and the swinging frames or wings are locked or held in closed or folded position by short chains E' and hooks F' (see Fig. 3) in an obvious manner.

From the construction shown and described it will be seen that the swinging frames or wings on each side of the car are adapted to be thrown outwardly or folded up against the side of the car, that the cutting devices may be raised and lowered at will, and that as the cutting devices are adapted to be adjusted or removed from the carriers any desired profile may be given to the surface each side of the railroad-tracks and any given depth of work secured.

We will now proceed to describe the mechanism by means of which the wings on each side of the car are vibrated upon their hinges or pivots.

G' G' are two reciprocating arms, the outer ends of which are pivoted, as shown at H', to the respective vibrating wings and traverse under guide-plates I' and over a frame. (Shown in dotted lines at Fig. 5.) The free ends of these reciprocating arms are each connected with one end of a chain J', the opposite end of which is connected with the pivoted end of the said arms. Said chains are led over trend or lead pulleys K' and around an operating chain-seat pulley L' on the shaft of a hand-wheel M'. The shafts of the hand-wheels M' are each provided with a ratchet-wheel N', which are checked by gravity-pawls N'', (see Fig. 2,) and in an obvious manner when the hand-wheels are rotated in the direction to cause the chain to pull upon the inner or free end of the reciprocating arm G' said arm is forced outwardly and of necessity spreads the pivoted or hinged wing to which it is connected and carries it away from the side of the car and to an extent commensurate with the degree of rotation of the hand-wheel and accordingly locates the cutter or shouldering blade or other device carried by the carrier P at any desired distance from the railroad-track, and when it has been thus located the pawl N'' operates to hold it in such fixed position. The vertical position of the cutter, shouldering-blade, or other device is then adjusted vertically by the mechanism already described, and when the car is propelled or drawn by a locomotive coupled therewith the cutter or other device is caused to perform its function.

When it is desired to cease the operation of the machine and put it in condition for simple transportation upon the railroad-tracks, the pawls N'' are released from the ratchets M' and the hand-wheels are turned in a direction reverse to that described for opening the pivoted wings, and the draft of the chains J' being then upon the opposite or pivoted ends of the reciprocating arms G' the latter are hauled inwardly and necessarily and obviously fold the wings against the sides of the car.

Each of the wings is operated by independent hand-wheels M' and chains and pulleys, as described, in order that either or both of the wings, with their shouldering or cutting devices, may be brought into action as occasion may demand.

In order to secure the greatest degree of lightness with the maximum strength in the reciprocating arms G' and at the same time provide a space for the operating-chains J', we construct them, as shown at Fig. 5, of two parallel bars or beams with suitable connecting-heads O'. These reciprocating arms may be provided with antifriction-rollers or other suitable means to render them capable of easy movement, and likewise the vertically-reciprocating cutter-carriers are adapted to rise and fall with as little friction as possible.

The two posts or frames D are connected at their upper ends by a suitable bridge or tie beam O².

The foot-brake C' may be held in operative position by the operator, or any suitable ratchet mechanism may be employed to hold it, or by the chains Z, as previously described; but we prefer to use the chains Z, because when the cutters meet with any excessive resisting body the carrier is free to rise and ride over such impediment and to again descend to the plane of its work.

The hand-wheels M' are mounted, as shown, in suitable bearings P', secured to the top of a pedestal Q', erected upon the platform of the car. This pedestal is properly braced to secure the necessary strength and rigidity, and a suitable platform R' may be provided for the operators of the wheels M' to stand upon.

Suitable seats or rostrums S' are provided for the operating crew to ride upon when the wings are folded and locked and the car is being transported from one point to another.

It will be seen that the cutter or plow or other grading device l being adjustably connected with the carrier P through the medium of bolts said cutter may have its relation with said carrier changed at will and that cutters of different design and construction may be substituted one for another, according to the character of work to be performed.

The means shown and described for operating the wings and the cutter-carriers are designed to rapidly perform their respective functions, because the time when the machine may occupy the road is frequently very limited, owing to the schedule movements of business trains thereon, which requires that the shouldering-machine should not only perform its work with rapidity, but that it may also promptly leave the main road for a switch or siding and again promptly return to work after the passage of a regular train, and we have with the construction shown demonstrated that with the machine in its normal condition, with the wings folded, as shown in Fig. 5, the said wings may be spread and the cutters put into operative position within a period of time not exceeding forty-five seconds and again restored to normal condition within a like period of time.

We have not deemed it necessary to describe all of the details of construction of the car, which simply constitutes the support or carrier of the machine, and we do not wish to be confined to the exact details of construction in the operative parts of the machine proper, as they may be largely varied without departing from the spirit of our invention. The machine when constructed as described may, according to the character and design of the cutters and the position given to them laterally and vertically, be readily employed for leveling along a main line, for forming subgrade of a "turnout" parallel thereto, or for the displacement of material. All surplus material may be removed from both sides of the road. It cuts a uniform shoulder, with lines exactly parallel to the rails both on tangents and curves, and can be run at a rate of speed varying from four to ten miles an hour. It may be used for weeding, smoothing, and ditching, in track lifting and ballasting, and on construction-work generally.

What we claim as new, and desire to secure by Letters Patent, is—

1. A machine for use in shouldering, grading and other work in railroad construction, consisting of a car mounted upon suitable trucks, and adapted to move upon a railroad-track, and having wing-frames hinged or pivoted on one or both sides of the car and adapted to be extended laterally, or folded against the sides of the car, a vertically-reciprocating frame or carrier located within the vibrating wing, a shouldering-blade or equivalent device adjustably and removably connected with the lower end of the reciprocating frame or carrier, means for raising and lowering the reciprocating frame or carrier, and a laterally-reciprocating arm pivotally connected at its outer end with the vibrating wing, and means for reciprocating and holding said arm, substantially as and for the purposes set forth.

2. In combination with a car mounted upon suitable trucks, one or more laterally-vibrating wings hinged or pivoted to the sides of the car, and provided with a vertically-reciprocating frame or carrier provided with an adjustable knife, plow or equivalent device, and with a vertically-arranged rack-bar, a hand-wheel mounted upon the wing and provided with a pinion meshing with the rack-bar of the carrier, a laterally-reciprocating arm pivotally connected at its outer end with the vibrating wing, and connected at its opposite ends with the two ends of an operating-chain, and means for hauling the operating-chain in reverse directions, substantially as and for the purpose set forth.

3. The wings pivoted to the side of the car, and provided with a reciprocating knife or plow carrier and means for operating the same, and having a platform or footboard secured to the inner side, substantially as and for the purposes set forth.

4. In combination with the wings hinged or pivoted to the side of the car, and provided with a reciprocating frame or blade carrier and means for raising said carrier, the chains Z, and hooks A', for holding the carrier in elevated position substantially as described.

5. In combination with the wings pivoted or hinged to the side of the car and provided with a reciprocating carrier, the lever W, pivoted to the wing and connected at one end to the reciprocating carrier and provided at its opposite end with a counterbalancing-weight V, substantially as and for the purpose set forth.

6. In combination with the car A and laterally-vibrating wings hinged or pivoted thereto, the laterally-reciprocating arms G' pivoted at their outer ends to the wings, the chains J' connected to the two ends of the arms G', the pulleys K', L', hand-wheels M', ratchets N' and pawls $N^2$ substantially as and for the purposes set forth.

7. The reciprocating arms G', formed of two parallel parts secured at their ends by heads O' to constitute a space for the operating-chains J', substantially as described.

In testimony whereof we have set our names to this specification in the presence of subscribing witnesses.

FRANK BARR.
JOHN T. CHAMBERLAIN.
LOUVILLE CURTIS.
GEORGE L. R. FRENCH.
ABRAHAM C. STICKNEY.
EDWARD T. MILLAR.

Witnesses as to the signature of Frank Barr:
A. H. HAYDEN,
F. M. DROZE.

Witnesses as to the signatures of John T. Chamberlain, Louville Curtis, George L. R. French, Abraham C. Stickney, and Edward T. Millar:
LAURICE A. F. WOOD,
G. R. FERGUSON.